(12) United States Patent
Prevost

(10) Patent No.: US 10,752,853 B2
(45) Date of Patent: Aug. 25, 2020

(54) COPOLYMER THAT CAN BE USED AS DETERGENT ADDITIVE FOR FUEL

(71) Applicant: TOTAL MARKETING SERVICES, Puteaux (FR)

(72) Inventor: Julie Prevost, Lyons (FR)

(73) Assignee: TOTAL MARKETING SERVICES, Puteaux (FR)

( * ) Notice: Subject to any disclaimer, the term of this patent is extended or adjusted under 35 U.S.C. 154(b) by 43 days.

(21) Appl. No.: 15/761,400

(22) PCT Filed: Sep. 15, 2016

(86) PCT No.: PCT/FR2016/052327
§ 371 (c)(1),
(2) Date: Mar. 19, 2018

(87) PCT Pub. No.: WO2017/046526
PCT Pub. Date: Mar. 23, 2017

(65) Prior Publication Data
US 2018/0265793 A1    Sep. 20, 2018

(30) Foreign Application Priority Data

Sep. 18, 2015  (FR) ...................................... 15 58831

(51) Int. Cl.
| | | |
|---|---|---|
| *C10L 1/196* | (2006.01) | |
| *C08F 2/38* | (2006.01) | |
| *C08F 8/32* | (2006.01) | |
| *C08F 293/00* | (2006.01) | |
| *C10L 10/06* | (2006.01) | |
| *C10L 1/236* | (2006.01) | |
| *C10L 10/18* | (2006.01) | |
| *C08F 8/44* | (2006.01) | |
| *C08L 53/00* | (2006.01) | |

(52) U.S. Cl.
CPC .............. *C10L 1/1963* (2013.01); *C08F 2/38* (2013.01); *C08F 8/32* (2013.01); *C08F 8/44* (2013.01); *C08F 293/005* (2013.01); *C08L 53/00* (2013.01); *C10L 1/236* (2013.01); *C10L 1/2364* (2013.01); *C10L 10/06* (2013.01); *C10L 10/18* (2013.01); *C08F 2438/03* (2013.01); *C10L 2270/026* (2013.01)

(58) Field of Classification Search
CPC .................................. C10L 1/1963; C08F 2/38
See application file for complete search history.

(56) References Cited

U.S. PATENT DOCUMENTS

| | | |
|---|---|---|
| 3,067,163 A | 12/1962 | La Verne Norman Bauer |
| 3,214,498 A | 10/1965 | Bauer |
| 4,136,047 A | 1/1979 | Rogan et al. |
| 4,161,392 A | 7/1979 | Cusano et al. |
| 4,171,959 A | 10/1979 | Vartanian |

(Continued)

FOREIGN PATENT DOCUMENTS

| | | |
|---|---|---|
| CA | 2803207 A1 | 12/2011 |
| EP | 0304313 A2 | 2/1989 |

(Continued)

OTHER PUBLICATIONS

Matyjaszewski, Krzysztof et al., "Macromolecular Engineering by Atom Transfer Radical Polymerization.", Journal of the American Chemical Society, vol. 136, pp. 6513-6533, (2014).
Matyjaszewski, Krzysztof, "Atom Transfer Radical Polymerization (ATRP): Current Status and Future Perspectives.", Macromolecules, American Chemical Society, vol. 45, pp. 4015-4039, (2012).

(Continued)

*Primary Examiner* — Ellen M McAvoy
*Assistant Examiner* — Ming Cheung Po
(74) *Attorney, Agent, or Firm* — Oliff PLC

(57) ABSTRACT

A block copolymer including: at least one block A of following formula (I):

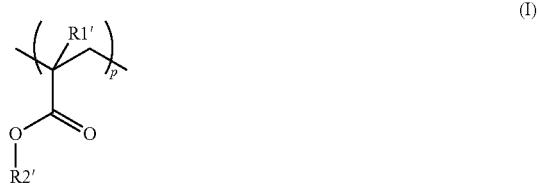

in which p is an integer ranging from 2 to 100, R1' is selected from hydrogen and the methyl group, R2' is chosen from C1 to C34 hydrocarbon-based chains, at least one block B of following formula (II):

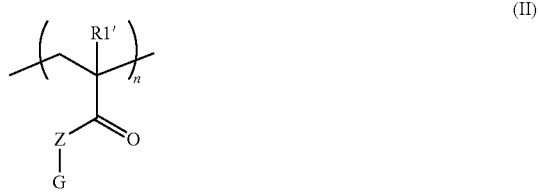

in which n is an integer ranging from 2 to 40, R1 is chosen from hydrogen and the methyl group, Z is chosen from the oxygen atom and the group —NR'— with R' being chosen from a hydrogen atom and C1 to C12 hydrocarbon-based chains, G is a C1 to C34 hydrocarbon-based chain substituted by at least one quaternary ammonium group and optionally one or more hydroxyl groups. Also, the use of such a block copolymer as detergent additive in an internal combustion engine liquid fuel.

15 Claims, No Drawings

(56) References Cited

U.S. PATENT DOCUMENTS

| | | | | |
|---|---|---|---|---|
| 4,755,563 | A | * | 7/1988 | West .................. C08F 293/005 524/535 |
| 5,011,504 | A | * | 4/1991 | Henry .................... C10L 1/143 44/392 |
| 2005/0288192 | A1 | | 12/2005 | Alexander et al. |
| 2013/0104826 | A1 | | 5/2013 | Burgess et al. |
| 2015/0315506 | A1 | | 11/2015 | Dubois |
| 2018/0030363 | A1 | | 2/2018 | Prevost et al. |
| 2018/0030364 | A1 | | 2/2018 | Prevost et al. |

FOREIGN PATENT DOCUMENTS

| | | | |
|---|---|---|---|
| EP | 0382493 A1 | | 8/1990 |
| EP | 2056527 A1 | | 5/2009 |
| EP | 3056526 A1 | | 8/2016 |
| JP | 2001-040377 A | | 2/2001 |
| WO | 2006/135881 A2 | | 12/2006 |
| WO | 2009/077396 A1 | | 6/2009 |
| WO | WO-2009077396 A1 * | 6/2009 | ............ C10L 1/2366 |
| WO | 2011/161149 A1 | | 12/2011 |
| WO | 2014/029770 A1 | | 2/2014 |

OTHER PUBLICATIONS

Moad, Graeme et al., "Living Radical Polymerization by the RAFT Process—A Third Update.", Australian Journal of Chemistry, vol. 65, pp. 985-1076, (2012).

Arondel, Mathieu et al., "Evaluating Injector Fouling in Direct Injection Spark Ignition Engines—A New Engine Test Procedure to Evaluate the Deposit Control Performance of Base Fuels and Additivated Fuels.", Conventional and future energy for automobiles, 10th International Colloquium, pp. 375-386, (2015).

Dec. 19, 2016 Written Opinion of the International Searching Authority issued in Patent Application No. PCT/FR2016/052325.

Dec. 19, 2016 International Search Report issued in Patent Application No. PCT/FR2016/052325.

Baines, F. L. et al., "Synthesis and Solution Properties of Water-Soluble Hydrophilic-Hydrophobic Block Copolymers", Macromolecules, American Chemical Society, vol. 29, No. 10, pp. 3416-3420, (1996).

Vijayakrishna, Kari et al., "Synthesis by RAFT and Ionic Responsiveness of Double Hydrophilic Block Copolymers Based on Ionic Liquid Monomer Units.", Macromolecules, American Chemical Society, vol. 41, No. 17, pp. 6299-6308, (2008).

Jia, Yimei et al., "Use of quaternised methacrylate polymers and copolymers as catalysts and structure directors for the formation of silica from silicic acid.", Journal of Materials Chemistry, vol. 15, No. 22, pp. 2202-2209, (2005).

Jan. 18, 2017 International Search Report issued in Patent Application No. PCT/FR2016/052326.

Dec. 6, 2016 International Search Report issued in Patent Application No. PCT/FR2016/052327.

Jan. 18, 2017 Written Opinion of the International Searching Authority issued in Patent Application No. PCT/FR2016/052326.

Dec. 6, 2016 Written Opinion of the International Searching Authority issued in Patent Application No. PCT/FR2016/052327.

U.S. Appl. No. 15/761,378, filed Mar. 19, 2018 in the name of Julie Prevost.

U.S. Appl. No. 15/761,362, filed Mar. 19, 2018 in the name of Julie Prevost.

Jan. 24, 2020 Office Action issued in U.S. Appl. No. 15/761,378.

* cited by examiner

COPOLYMER THAT CAN BE USED AS DETERGENT ADDITIVE FOR FUEL

The present invention relates to a block copolymer and to the use thereof as detergent additive in a liquid fuel for an internal combustion engine. The invention also relates to a process for keeping clean and/or for cleaning at least one of the internal parts of an internal combustion engine.

PRIOR ART

Liquid fuels for internal combustion engines contain components that can degrade during the functioning of the engine. The problem of deposits in the internal parts of combustion engines is well known to motorists. It has been shown that the formation of these deposits has consequences on the performance of the engine and in particular a negative impact on consumption and particle emissions. Progress in the technology of fuel additives has made it possible to face up to this problem. "Detergent" additives used in fuels have already been proposed to keep the engine clean by limiting deposits ("keep-clean" effect) or by reducing the deposits already present in the internal parts of the combustion engine ("clean-up" effect). Mention may be made, for example, of U.S. Pat. No. 4,171,959 which describes a detergent additive for gasoline fuel containing a quaternary ammonium function. WO 2006/135 881 describes a detergent additive containing a quaternary ammonium salt used for reducing or cleaning deposits, especially on the inlet valves. However, engine technology is in constant evolution and the stipulations for fuels must evolve to cope with these technological advances of combustion engines. In particular, the novel gasoline or diesel direct-injection systems expose the injectors to increasingly severe pressure and temperature conditions, which promotes the formation of deposits. In addition, these novel injection systems have more complex geometries to optimize the spraying, especially, from more numerous holes having smaller diameters, but which, on the other hand, induce greater sensitivity to deposits. The presence of deposits may impair the combustion performance and in particular increase pollutant emissions and particle emissions. Other consequences of the excessive presence of deposits have been reported in the literature, such as the increase in fuel consumption and maneuverability problems.

Preventing and reducing deposits in these novel engines are essential for optimum functioning of modern engines. There is thus a need to propose detergent additives for fuel which promote optimum functioning of combustion engines, especially for novel engine technologies.

There is also a need for a universal detergent additive that is capable of acting on deposits irrespective of the technology of the engine and/or the nature of the fuel.

SUBJECT OF THE INVENTION

The subject of the invention relates to novel block copolymers.

The Applicant has discovered that the block copolymers according to the invention have noteworthy properties as detergent additive in liquid fuels for internal combustion engines. The block copolymers according to the invention used in these fuels can keep the engine clean, in particular by limiting or preventing the formation of deposits ("keep-clean" effect) or by reducing the deposits already present in the internal parts of the combustion engine ("clean-up" effect).

The advantages associated with the use of such copolymers according to the invention are:
optimum functioning of the engine,
reduction of the fuel consumption,
better maneuverability of the vehicle,
reduced pollutant emissions, and
savings due to less engine maintenance.

The subject of the present invention relates to a block copolymer comprising:
at least one block A of formula (I) below:

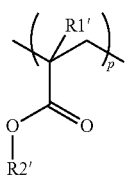

in which
p is an integer ranging from 2 to 100,
$R_1'$ is chosen from hydrogen and a methyl group,
$R'_2$ is chosen from $C_1$ to $C_{34}$ hydrocarbon-based chains,
at least one block B of formula (II) below:

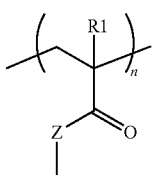

in which
n is an integer ranging from 2 to 40,
$R_1$ is chosen from hydrogen and a methyl group,
Z is chosen from an oxygen atom and a group —NR'— with R' being chosen from a hydrogen atom and $C_1$ to $C_{12}$ hydrocarbon-based chains,
G is a $C_1$ to $C_{34}$ hydrocarbon-based chain substituted with at least one quaternary ammonium group and optionally one or more hydroxyl groups.

According to a first embodiment, p is an integer ranging from 2 to 40.

According to another variant, p is an integer greater than 40 and less than or equal to 100.

According to a preferred embodiment, $R'_2$ is chosen from $C_4$ to $C_{30}$ hydrocarbon-based chains.

According to a preferred embodiment, the copolymer has a number-average molar mass (Mn) ranging from 1000 to 10 000 g·mol$^{-1}$.

According to a particular embodiment, the block copolymer comprises:
block A consists of a chain of structural units derived from an alkyl (meth)acrylate monomer ($m_a$), and
block B consists of a chain of structural units derived from an alkyl (meth)acrylate or alkyl(meth)acrylamide monomer ($m_b$), the alkyl radical of which is constituted by a $C_1$ to $C_{34}$ hydrocarbon-based chain substituted with at least one quaternary ammonium group and optionally one or more hydroxyl groups.

Advantageously, the monomer ($m_a$) is chosen from $C_1$ to $C_{34}$ alkyl acrylates and $C_1$ to $C_{34}$ alkyl methacrylates.

Even more advantageously, the monomer ($m_a$) is chosen from $C_4$ to $C_{34}$ alkyl acrylates and $C_4$ to $C_{34}$ alkyl methacrylates.

More preferably, the monomer ($m_a$) is chosen from $C_4$ to $C_{30}$ alkyl acrylates and $C_4$ to $C_{30}$ alkyl methacrylates.

According to a particular embodiment, the monomer ($m_a$) is chosen from $C_4$ to $C_{34}$ alkyl acrylates and $C_4$ to $C_{34}$ alkyl methacrylates and the copolymer has a number-average molar mass (Mn) ranging from 1000 to 10 000 g·mol$^{-1}$.

According to a particular embodiment, the alkyl radical of the monomer ($m_b$) is substituted with at least one quaternary ammonium group and one or more hydroxyl groups.

Advantageously, the quaternary ammonium group is chosen from pyrrolinium, pyridinium, imidazolium, triazolium, triazinium, oxazolium and isoxazolium quaternary salts.

According to one variant, the quaternary ammonium group is chosen from trialkylammonium, guanidinium and liminium quaternary salts.

According to a preferred particular embodiment, block B is represented by one of the formulae (III) and (IV) below:

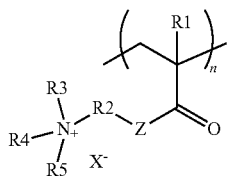

(III)

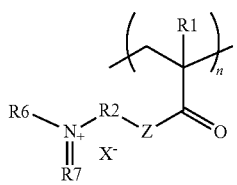

(IV)

in which
n, Z and $R_1$ are as defined in formula (II) above,
$X^-$ is chosen from hydroxide and halide ions and organic anions,
$R_2$ is chosen from $C_1$ to $C_{34}$ hydrocarbon-based chains, optionally substituted with at least one hydroxyl group,
$R_3$, $R_4$ and $R_5$ are identical or different and chosen independently from $C_1$ to $C_{18}$ hydrocarbon-based chains, it being understood that the alkyl groups $R_3$, $R_4$ and $R_5$ may contain one or more groups chosen from: a nitrogen atom, an oxygen atom and a carbonyl group and that the groups $R_3$, $R_4$ and $R_5$ may be connected together in pairs to form one or more rings,
$R_6$ and $R_7$ are identical or different and chosen independently from $C_1$ to $C_{18}$ hydrocarbon-based chains, it being understood that the groups $R_6$ and $R_7$ may contain one or more groups chosen from: a nitrogen atom, an oxygen atom and a carbonyl group and that the groups $R_6$ and $R_7$ may be connected together to form a ring.

Advantageously, the group $R_2$ is represented by one of the formulae (V) and (VI) below:

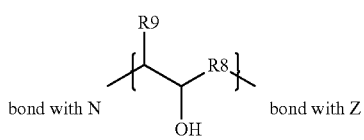

(V)

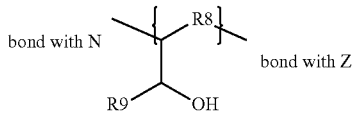

(VI)

in which
$R_8$ is chosen from $C_1$ to $C_{32}$ hydrocarbon-based chains,
$R_9$ is chosen from hydrogen and $C_1$ to $C_6$ alkyl groups.

According to a particular embodiment, block B of formula (III), (IV), (V) or (VI) is derived from a monomer ($m_b$) obtained by the reaction:
of a tertiary amine of formula $NR_3R_4R_5$ or $R_6N=R_7$ in which $R_3$, $R_4$, $R_5$, $R_6$ and $R_7$ are as defined in formulae (II), (III) and (IV) above, and
of a (meth)acrylate or (meth)acrylamide intermediate monomer ($m_i$) of formula (VII) below:

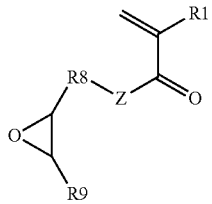

(VII)

in which
Z, $R_1$, $R_8$ and $R_9$ are as defined in formulae (II), (V) and (VI) above.

According to another particular embodiment, block B is obtained by post-functionalization of an intermediate polymer Pi comprising at least one block P of formula (VIII) below:

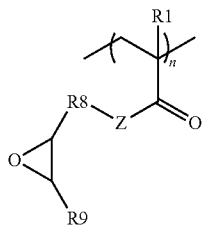

(VIII)

in which
n, Z, $R_1$, $R_8$ and $R_9$ are as defined in formulae (II), (V) and (VI) above,
and in which said post-functionalization corresponds to the reaction of said intermediate polymer Pi with a tertiary amine $NR_3R_4R_5$ or $R_6N=R_7$ in which $R_3$, $R_4$, $R_5$, $R_6$ and $R_7$ are as defined above in formulae (III) and (IV).

Advantageously, the intermediate polymer Pi also comprises at least one block A as defined above.

According to a particular embodiment, the block copolymer is obtained by sequenced polymerization, optionally followed by one or more post-functionalizations.

According to a particular embodiment, the copolymer is a copolymer comprising at least one sequence of blocks AB, ABA or BAB in which said blocks A and B form a sequence without the presence of an intermediate block of different chemical nature.

The subject of the present invention also relates to a concentrate for fuel comprising one or more block copolymers as described above, mixed with an organic liquid, said organic liquid being inert with respect to the block copolymer(s) and miscible with said fuel.

The subject of the present invention also relates to a fuel composition comprising:
(1) a fuel derived from one or more sources chosen from the group consisting of mineral, animal, plant and synthetic sources, and
(2) one or more block copolymers as defined previously.

Advantageously, the composition comprises at least 5 ppm of block copolymer(s) (2).

According to a particular embodiment, the fuel (1) is chosen from hydrocarbon-based fuels, fuels that are not essentially hydrocarbon-based, and mixtures thereof.

The subject of the present invention also relates to the use of one or more block copolymers as defined above as detergent additive in a liquid fuel for internal combustion engines, said copolymer being used alone, as a mixture or in the form of a concentrate as defined above.

According to a particular embodiment, the copolymer is used in the liquid fuel to keep clean and/or to clean at least one of the internal parts of said internal combustion engine.

According to a preferred particular embodiment, the copolymer is used in the liquid fuel to limit or prevent the formation of deposits in at least one of the internal parts of said engine and/or to reduce the existing deposits in at least one of the internal parts of said engine.

According to a particular embodiment, the copolymer is used to reduce the fuel consumption of internal combustion engines.

According to a particular embodiment, the copolymer is used to reduce the pollutant emissions, in particular the particle emissions, of internal combustion engines.

According to a particular embodiment, the internal combustion engine is a spark ignition engine.

Advantageously, the deposits are located in at least one of the internal parts chosen from the engine intake system, the combustion chamber and the fuel injection system.

According to another particular embodiment, the internal combustion engine is a diesel engine, preferably a direct-injection diesel engine.

Advantageously, the copolymer is used to prevent and/or reduce the formation of deposits in the injection system of a diesel engine.

In particular, the copolymer is used to prevent and/or reduce the formation of coking-related deposits and/or deposits of soap and/or lacquering type.

According to a particular embodiment, the copolymer is used to reduce and/or prevent power loss due to the formation of said deposits in the internal parts of a direct-injection diesel engine, said power loss being determined according to the standardized engine test method CEC F-98-08.

According to a particular embodiment, the copolymer is used to reduce and/or prevent restriction of the fuel flow emitted by the injector during the functioning of said diesel engine, said flow restriction being determined according to the standardized engine test method CEC F-23-1-01.

DETAILED DESCRIPTION

Other advantages and characteristics will emerge more clearly from the description that follows. The particular embodiments of the invention are given as nonlimiting examples.

According to a particular embodiment, a block copolymer comprises at least one block A and at least one block B.

Block A is represented by formula (I) below:

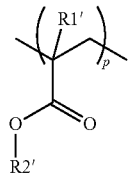

in which
p is an integer ranging from 2 to 100, preferably from 2 to 40, preferably from 3 to 30, more preferentially from 4 to 20, even more preferentially from 5 to 10,
$R_1'$ is chosen from hydrogen and a methyl group, preferably methyl,
$R'_2$ is chosen from $C_1$ to $C_{34}$, preferably $C_4$ to $C_{30}$, more preferentially $C_6$ to $C_{24}$ and even more preferentially $C_8$ to $C_{22}$ hydrocarbon-based chains, said chains being linear or branched, cyclic or acyclic, preferably acyclic. Alkyl groups will be preferred.

According to a preferred embodiment, p is an integer ranging from 2 to 40 and $R'_2$ is chosen from $C_4$ to $C_{30}$ hydrocarbon-based chains.

According to a preferred embodiment, p is an integer ranging from 2 to 40 and R
number-average molar mass (Mn) ranging from 1000 to 10 000 g·mol$^{-1}$.

The term "hydrocarbon-based chain" means a chain constituted exclusively of carbon and hydrogen atoms, said chain possibly being linear or branched, cyclic, polycyclic or acyclic, saturated or unsaturated, and optionally aromatic or polyaromatic. A hydrocarbon-based chain may comprise a linear or branched part and a cyclic part. It may comprise an aliphatic part and an aromatic part.

According to one variant, p is an integer greater than 40 and less than or equal to 100, preferably greater than 40 and less than or equal to 80, even more preferentially from 41 to 70 and even more preferentially from 41 to 50.

According to a preferred embodiment of this variant, p is an integer greater than 40 and less than or equal to 100, and $R'_2$ is chosen from $C_4$ to $C_{30}$ hydrocarbon-based chains.

Block B is represented by formula (II) below:

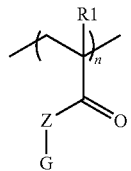

in which
n is an integer ranging from 2 to 40, preferably from 3 to 30, more preferentially from 4 to 20, even more preferentially from 5 to 10,
$R_1$ is chosen from hydrogen and a methyl group,
Z is chosen from an oxygen atom and a group —NR'— with R' being chosen from a hydrogen atom and $C_1$ to $C_{12}$ and preferably $C_1$ to $C_6$ hydrocarbon-based chains, said chains being linear or branched, cyclic or acyclic, preferably acyclic. Z is preferably chosen from an oxygen atom and an —NH— group.

G is a $C_1$ to $C_{34}$, preferably $C_1$ to $C_{18}$ and more preferentially $C_1$ to $C_{10}$ hydrocarbon-based chain, which is linear or branched, cyclic or acyclic, preferably acyclic, substituted with at least one quaternary ammonium group preferably containing from 4 to 50 atoms and optionally one or more hydroxyl groups.

According to a preferred particular embodiment, Z is an oxygen atom.

According to a particular embodiment, the group G comprises the quaternary ammonium group and one or more hydroxyl groups.

According to a particular embodiment, block B is represented by one of the formulae (III) and (IV) below:

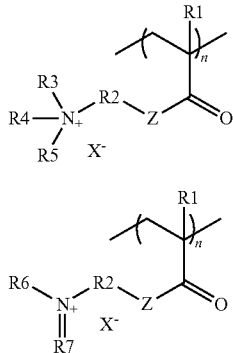

in which
n, Z and $R_1$ are as described above,
X— is chosen from hydroxide and halide ions and organic anions, in particular the acetate ion,
R2 is chosen from C1 to C34 and preferably C1 to C18 hydrocarbon-based chains, which are cyclic or acyclic, linear or branched, optionally substituted with at least one hydroxyl group; preferably, R2 is chosen from alkyl groups, optionally substituted with at least one hydroxyl group,
R3, R4 and R5 are identical or different and chosen independently from linear or branched, cyclic or acyclic C1 to C18 and preferably C1 to C12 hydrocarbon-based chains, it being understood that the alkyl groups R3, R4 and R5 may contain one or more oxygen and/or nitrogen atoms and/or carbonyl groups and may be connected together in pairs to form one or more rings,
R6 and R7 are identical or different and chosen independently from linear or branched, cyclic or acyclic C1 to C18 and preferably C1 to C12 hydrocarbon-based chains, it being understood that the groups R6 and R7 may contain one or more nitrogen and/or oxygen atoms and/or carbonyl groups and may be connected together to form a ring.

The nitrogen and/or oxygen atom(s) may be present in the groups $R_3$, $R_4$ and $R_5$ in the form of ether bridges or an amine bridge or in the form of an amine or hydroxyl substituent.

The organic anions of the group X⁻ are generally conjugate bases of organic acids, preferably conjugate bases of carboxylic acids, in particular acids chosen from cyclic or acyclic monocarboxylic and polycarboxylic acids. Preferably, the organic anions of the group X⁻ are chosen from conjugate bases of saturated acyclic or aromatic cyclic carboxylic acids. Examples that will be mentioned include methanoic acid, acetic acid, adipic acid, oxalic acid, malonic acid, succinic acid, citric acid, benzoic acid, phthalic acid, isophthalic acid and terephthalic acid.

According to a particular embodiment, the group $R_2$ is chosen from linear or branched $C_1$ to $C_{34}$ and preferably $C_1$ to $C_{18}$ acyclic alkyl groups, substituted with at least one hydroxyl group.

According to a particular embodiment, the group $R_2$ is represented by one of the formulae (V) and (VI) below:

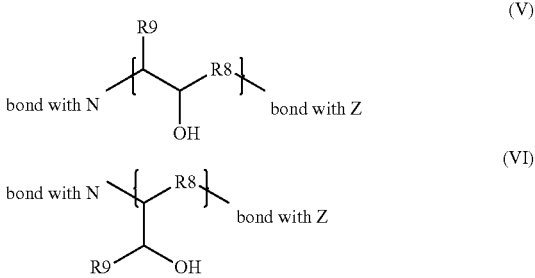

in which
R8 is chosen from cyclic or acyclic, preferably acyclic, linear or branched C1 to C32 and preferably C1 to C16 hydrocarbon-based chains, preferably alkyl groups,
R9 is chosen from hydrogen and C1 to C6, C1 to C4 alkyl groups, more preferentially hydrogen.

According to a particular embodiment, block A consists of a chain of structural units derived from an alkyl acrylate or alkyl methacrylate monomer $m_a$ and block B consists of a chain of structural units derived from an alkyl acrylate, alkyl methacrylate, alkylacrylamide or alkylmethacrylamide monomer $m_b$, the alkyl radical of which is constituted by a saturated linear or branched $C_1$ to $C_{34}$ and preferably $C_1$ to $C_{18}$ hydrocarbon-based chain, which is preferably acyclic, substituted with at least one quaternary ammonium group and optionally one or more hydroxyl groups.

For reasons of simplicity, the terms "alkyl (meth)acrylate" and "alkyl(meth)acrylamide" will be used in the continuation of the description to indicate alkyl acrylate or alkyl methacrylate (alkyl (meth)acrylate) and alkylacrylamide or alkylmethacrylamide (alkyl(meth)acrylamide).

The block copolymer may be prepared according to any known polymerization process. The various polymerization techniques and conditions are widely described in the literature and fall within the general knowledge of a person skilled in the art.

According to a particular embodiment, the block copolymer is obtained by copolymerization of at least the alkyl (meth)acrylate monomer $m_a$ and of at least the monomer $m_b$.

The monomer $m_a$ is preferably chosen from $C_1$ to $C_{34}$, preferably $C_4$ to $C_{30}$, more preferentially $C_6$ to $C_{24}$ and more preferentially $C_8$ to $C_{22}$ alkyl acrylates or methacrylates. The alkyl radical of the acrylate or methacrylate is linear or branched, cyclic or acyclic, preferably acyclic.

Among the alkyl (meth)acrylates that may be used in the manufacture of the block copolymer of the invention, mention may be made, in a nonlimiting manner, of: n-octyl acrylate, n-octyl methacrylate, n-decyl acrylate, n-decyl methacrylate, n-dodecyl acrylate, n-dodecyl methacrylate, 2-ethylhexyl acrylate, 2-ethylhexyl methacrylate, isooctyl acrylate, isooctyl methacrylate, isodecyl acrylate, isodecyl methacrylate.

According to a particular embodiment, the alkyl radical of the monomer $m_b$ is substituted with at least one quaternary ammonium group and one or more hydroxyl groups.

It is understood that it would not constitute a departure from the scope of the invention if the copolymer according to the invention was obtained from monomers other than $m_a$ and $m_b$, insofar as the final copolymer corresponds to that of the invention, i.e. obtained by copolymerization of at least $m_a$ and $m_b$. For example, it would not constitute a departure from the scope of the invention if the copolymer were obtained by copolymerization of monomers other than $m_a$ and $m_b$ followed by a post-functionalization.

For example, the units derived from an alkyl (meth) acrylate monomer $m_a$ may be obtained from a polymethyl (meth)acrylate fragment, by transesterification reaction using an alcohol of chosen chain length to form the expected alkyl group.

An example of post-functionalization of the monomers $m_b$ is illustrated below.

The block copolymers may be obtained by sequenced polymerization, preferably by controlled sequenced polymerization, optionally followed by one or more post-functionalizations.

According to a particular embodiment, the block copolymer described above is obtained by controlled sequenced polymerization. The polymerization is advantageously chosen from controlled radical polymerization; for example atom transfer radical polymerization (ATRP); nitroxide-mediated radical polymerization (NMP: nitroxide-mediated polymerization); degenerative transfer processes such as degenerative iodine transfer polymerization (ITRP: iodine transfer radical polymerization) or reversible addition-fragmentation chain transfer radical polymerization (RAFT: reversible addition-fragmentation chain transfer); polymerizations derived from ATRP such as polymerizations using initiators for continuous activator regeneration (ICAR) or using activators regenerated by electron transfer (ARGET).

Mention will be made, by way of example, of the publication "Macromolecular Engineering by atom transfer radical polymerization" JACS, 136, 6513-6533 (2014), which describes a controlled sequenced polymerization process for forming block copolymers.

The controlled sequenced polymerization is typically performed in a solvent, under an inert atmosphere, at a reaction temperature generally ranging from 0 to 200° C., preferably from 50° C. to 130° C. The solvent may be chosen from polar solvents, in particular ethers such as anisole (methoxybenzene) or tetrahydrofuran, or apolar solvents, in particular paraffins, cycloparaffins, aromatic and alkylaromatic solvents containing from 1 to 19 carbon atoms, for example benzene, toluene, cyclohexane, methylcyclohexane, n-butene, n-hexane, n-heptane and the like.

For atom-transfer radical polymerization (ATRP), the reaction is generally performed under vacuum in the presence of an initiator, a ligand and a catalyst. As examples of ligands, mention may be made of N,N,N',N'',N''-pentamethyldiethylenetriamine (PMDETA), 1,1,4,7,10,10-hexamethyltriethylenetetramine (HMTETA), 2,2'-bipyridine (BPY) and tris(2-pyridylmethyl)amine (TPMA). Examples of catalysts that may be mentioned include: CuX, $CuX_2$, with X=Cl, Br and complexes based on ruthenium $Ru^{2+}/Ru^{3+}$.

The ATRP polymerization is preferably performed in a solvent chosen from polar solvents.

According to the controlled sequenced polymerization technique, it may also be envisaged to work under pressure.

According to a particular embodiment, the number of equivalents of monomer $m_a$ in block A and of monomer $m_b$ in block B reacted during the polymerization reaction are identical or different and have a value ranging independently from 2 to 40, preferably from 3 to 30, more preferentially from 4 to 20 and even more preferentially from 5 to 10. The term "number of equivalents" means the amounts (in moles) of material of the monomers $m_a$ of block A and of the monomers $m_b$ of block B during the polymerization reaction.

The number of equivalents of monomer $m_a$ of block A is advantageously greater than or equal to that of the monomer $m_b$ of block B. In addition, the weight-average molar mass $M_w$ of block A or of block B is preferably less than or equal to 15 000 g·mol$^{-1}$, more preferentially less than or equal to 10 000 g·mol$^{-1}$ The copolymer advantageously comprises at least one sequence of blocks AB, ABA or BAB in which said blocks A and B form a sequence without the presence of an intermediate block of different chemical nature.

Other blocks may optionally be present in the block copolymer described previously insofar as these blocks do not fundamentally change the nature of the block copolymer. However, block copolymers containing only blocks A and B will be preferred.

Advantageously, A and B represent at least 70% by mass, preferably at least 90% by mass, more preferentially at least 95% by mass and even more preferentially at least 99% by mass of the block copolymer.

According to a particular embodiment, the block copolymer is a diblock copolymer.

According to another particular embodiment, the block copolymer is a triblock copolymer containing alternating blocks comprising two blocks A and one block B (ABA) or comprising two blocks B and one block A (BAB).

According to a particular embodiment, the block copolymer also comprises an end chain I consisting of a cyclic or acyclic, saturated or unsaturated, linear or branched $C_1$ to $C_{32}$, preferably $C_4$ to $C_{24}$ and more preferentially $C_{10}$ to $C_{24}$ hydrocarbon-based chain.

The term "cyclic hydrocarbon-based chain" means a hydrocarbon-based chain of which at least part is cyclic, especially aromatic. This definition does not exclude hydrocarbon-based chains comprising both an acyclic part and a cyclic part.

The end chain I may comprise an aromatic hydrocarbon-based chain, for example benzene-based, and/or a saturated and acyclic, linear or branched hydrocarbon-based chain, in particular an alkyl chain.

The end chain I is preferably chosen from alkyl chains, which are preferably linear, more preferentially alkyl chains of at least 4 carbon atoms and even more preferentially of at least 12 carbon atoms.

For the ATRP polymerization, the end chain I is located in the end position of the block copolymer. It may be introduced into the block copolymer by means of the polymerization initiator. Thus, the end chain I may advantageously constitute at least part of the polymerization initiator and is positioned within the polymerization initiator so as to make it possible to introduce, during the first step of polymerization initiation, the end chain I in the end position of the block copolymer.

The polymerization initiator is chosen, for example, from the free-radical initiators used in the ATRP polymerization process. These free-radical initiators well known to those skilled in the art are described especially in the article "Atom-transfer radical polymerization: current status and future perspectives, Macromolecules, 45, 4015-4039, 2012".

The polymerization initiator is chosen, for example, from carboxylic acid alkyl esters substituted with a halide, preferably a bromine in the alpha position, for example ethyl 2-bromopropionate, ethyl α-bromoisobutyrate, benzyl chloride or bromide, ethyl α-bromophenylacetate and chloroethylbenzene. Thus, for example, ethyl 2-bromopropionate may make it possible to introduce into the copolymer the end chain I in the form of a $C_2$ alkyl chain and benzyl bromide in the form of a benzyl group.

For the RAFT polymerization, the transfer agent may conventionally be removed from the copolymer at the end of polymerization according to any known process.

According to one variant, the end chain I may also be obtained in the copolymer by RAFT polymerization according to the methods described in the article by Moad, G. and co., Australian Journal of Chemistry, 2012, 65, 985-1076. For example, the end chain I may be introduced by aminolysis when a transfer agent is used. RAFT-type transfer agents are well known to those skilled in the art. A wide variety of RAFT-type transfer agents are available or are fairly readily synthesizable. Examples that may be mentioned include transfer agents of thiocarbonylthio, dithiocarbonate, xanthate, dithiocarbamate and trithiocarbonate type, for example $S,S_0$-dibenzyl trithiocarbonate (DBTTC), S,S-bis(α,α'-dimethyl-α''-acetic acid) trithiocarbonate (BD-MAT) or 2-cyano-2-propyl benzodithioate (CPD). According to a known process, the transfer agent may be cleaved at the end of polymerization by reacting a cleaving agent such as $C_2$-$C_6$ alkylamines; the end function of the copolymer may in this case be a thiol group —SH.

According to a particular embodiment, the block copolymer is a diblock copolymer. The block copolymer structure may be of the IAB or IBA type, advantageously IAB. The end chain I may be directly linked to block A or B according to the structure IAB or IBA, respectively, or may be connected via a bonding group, for example an ester, amide, amine or ether function. The bonding group then forms a bridge between the end chain I and block A or B.

According to a particular embodiment, the block copolymer may also be functionalized at the chain end according to any known process, especially by hydrolysis, aminolysis and/or nucleophilic substitution.

The term "aminolysis" means any chemical reaction in which a molecule is split into two parts by reaction of an ammonia molecule or an amine. A general example of aminolysis consists in replacing a halogen of an alkyl group by reaction with an amine, with removal of hydrogen halide. Aminolysis may be used, for example, for an ATRP polymerization which produces a copolymer bearing a halide in the end position or for a RAFT polymerization to remove the thio, dithio or trithio bond introduced into the copolymer by the RAFT transfer agent.

An end chain I' may thus be introduced by post-functionalization of the block copolymer obtained by controlled sequenced polymerization of the monomers $m_a$ and $m_b$ described above.

The end chain I' advantageously comprises a linear or branched, cyclic or acyclic $C_1$ to $C_{32}$, preferably $C_1$ to $C_{24}$ and more preferentially $C_1$ to $C_{10}$ hydrocarbon-based chain, even more preferentially an alkyl group, optionally substituted with one or more groups containing at least one heteroatom chosen from N and O, preferably N.

For an ATRP polymerization using a metal halide as catalyst, this functionalization may be performed, for example, by treating the copolymer IAB or IBA obtained by ATRP with a primary $C_1$ to $C_{32}$ alkylamine or a $C_1$ to $C_{32}$ alcohol under mild conditions so as not to modify the functions present on blocks A, B and I.

The quaternary ammonium group of block B described above may be acyclic or cyclic.

The acyclic quaternary ammonium group is advantageously chosen from trialkylammonium, guanidinium and iminium quaternary salts.

The cyclic quaternary ammonium group is advantageously chosen from heterocyclic compounds containing at least one nitrogen atom chosen in particular from pyrrolinium, pyridinium, imidazolium, triazolium, triazinium, oxazolium and isoxazolium quaternary salts.

The quaternary ammonium group of block B is advantageously a quaternary trialkylammonium salt.

According to a particular embodiment, block B is preferably derived from a monomer ($m_b$) obtained by the reaction:
of a tertiary amine of formula $NR_3R_4R_5$ or $R_6N{=}R_7$ in which $R_3$, $R_4$, $R_5$, $R_6$ and $R_7$ are as described above, and
of a (meth)acrylate or (meth)acrylamide intermediate monomer $m_i$ of formula (VII) below:

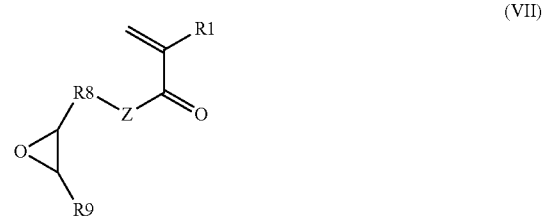

(VII)

in which
Z, $R_1$, $R_8$ and $R_9$ are as described above.

According to another particular embodiment, block B is obtained by post-functionalization of an intermediate polymer Pi comprising at least one block P of formula (VIII) below:

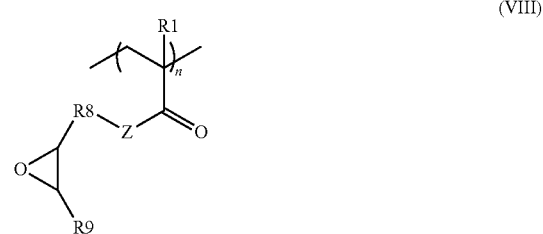

(VIII)

in which
n, Z, $R_1$, $R_8$ and $R_9$ are as described above.

The post-functionalization corresponds to the reaction of the intermediate polymer Pi with a tertiary amine of formula $NR_3R_4R_5$ or $R_6N{=}R_7$ in which $R_3$, $R_4$, $R_5$, $R_6$ and $R_7$ are as described previously.

The tertiary amine may be chosen, for example, from acyclic tertiary amines, preferably quaternizable trialkylamines, guanidines and imines. The tertiary amine is advantageously chosen from trialkylamines, in particular those in which the alkyl groups are identical or different and chosen independently from $C_1$ to $C_{18}$ and preferably $C_1$ to $C_{12}$ linear or branched, cyclic or acyclic, preferably acyclic, alkyls.

According to one variant, the tertiary amine may be chosen from cyclic tertiary amines, preferably quaternizable pyrrolines, pyridines, imidazoles, triazoles, guanidines, imines, triazines, oxazoles and isoxazoles.

The intermediate polymer Pi may also comprise at least one block A as described above.

According to a particular embodiment, block B of formula (III) or (IV) is obtained by quaternization, according to any known process, of a tertiary amine corresponding to the quaternary ammonium group of block B and of formula $NR_3R_4R_5$ or $R_6N=R_7$ in which $R_3$, $R_4$, $R_5$, $R_6$ and $R_7$ are as defined above. The quaternization step may be performed by post-functionalization of an intermediate polymer bearing the tertiary amine $NR_3R_4R_5$ or $R_6N=R_7$, for example by reaction with an alkyl halide optionally followed by an anion exchange reaction. Examples of quaternization that may be mentioned include a post-functionalization reaction of an intermediate polymer bearing the tertiary amine $NR_3R_4R_5$ or $R_6N=R_7$, by reaction with an epoxide (oxirane).

The quaternization step may also be performed before the copolymerization reaction, on the monomer bearing the tertiary amine $NR_3R_4R_5$ or $R_6N=R_7$, for example by reaction with an alkyl halide or an epoxide, post-functionalization nevertheless being preferred. Quaternization involving an epoxide will preferably be performed.

The block copolymer described above is particularly advantageous when it is used as detergent additive in a liquid fuel for an internal combustion engine.

The term "detergent additive for liquid fuel" means an additive which is incorporated in small amount into the liquid fuel and produces an effect on the cleanliness of said motor when compared with said liquid fuel not specially supplemented.

The liquid fuel is advantageously derived from one or more sources chosen from the group consisting of mineral, animal, plant and synthetic sources. Oil will preferably be chosen as mineral source.

The liquid fuel is preferably chosen from hydrocarbon-based fuels and fuels that are not essentially hydrocarbon-based, alone or as a mixture.

The term "hydrocarbon-based fuel" means a fuel constituted of one or more compounds constituted solely of carbon and hydrogen.

The term "fuel not essentially hydrocarbon-based" means a fuel constituted of one or more compounds not essentially constituted of carbon and hydrogen, i.e. which also contain other atoms, in particular oxygen atoms.

The hydrocarbon-based fuels especially comprise middle distillates with a boiling point ranging from 100 to 500° C. or lighter distillates with a boiling point in the gasoline range. These distillates may be chosen, for example, from the distillates obtained by direct distillation of crude hydrocarbons, vacuum distillates, hydrotreated distillates, distillates derived from the catalytic cracking and/or hydrocracking of vacuum distillates, distillates resulting from conversion processes such as ARDS (atmospheric residue desulfurization) and/or viscoreduction, and distillates derived from the upgrading of Fischer-Tropsch fractions. The hydrocarbon-based fuels are typically gasolines and gas oils (also known as diesel fuel).

The gasolines in particular comprise any commercially available fuel composition for spark ignition engines. A representative example that may be mentioned is the gasolines corresponding to standard NF EN 228. Gasolines generally have octane numbers that are high enough to avoid pinking. Typically, the fuels of gasoline type sold in Europe, in accordance with standard NF EN 228, have a motor octane number (MON) of greater than 85 and a research octane number (RON) of at least 95. Fuels of gasoline type generally have an RON ranging from 90 to 100 and an MON ranging from 80 to 90, the RON and MON being measured according to standard ASTM D 2699-86 or D 2700-86.

Gas oils (diesel fuels) in particular comprise all commercially available fuel compositions for diesel engines. A representative example that may be mentioned is the gas oils corresponding to standard NF EN 590.

Fuels that are not essentially hydrocarbon-based especially comprise oxygen-based compounds, for example distillates resulting from the BTL (biomass to liquid) conversion of plant and/or animal biomass, taken alone or in combination; biofuels, for example plant and/or animal oils and/or ester oils; biodiesels of animal and/or plant origin and bioethanols.

The mixtures of hydrocarbon-based fuel and of fuel that is not essentially hydrocarbon-based are typically gas oils of $B_x$ type or gasolines of $E_x$ type.

The term "gas oil of $B_x$ type for diesel engines" means a gas oil fuel which contains x % (v/v) of plant or animal ester oils (including spent cooking oils) transformed via a chemical process known as transesterification, obtained by reacting this oil with an alcohol so as to obtain fatty acid esters (FAE). With methanol and ethanol, fatty acid methyl esters (FAME) and fatty acid ethyl esters (FAEE) are obtained, respectively. The letter "B" followed by a number indicates the percentage of FAE contained in the gas oil. Thus, a B99 contains 99% of FAE and 1% of middle distillates of fossil origin (mineral source), B20 contains 20% of FAE and 80% of middle distillates of fossil origin, etc. Gas oils of $B_0$ type which do not contain any oxygen-based compounds are thus distinguished from gas oils of Bx type which contain x % (v/v) of plant oil esters or of fatty acid esters, usually the methyl esters (POME or FAME). When the FAE is used alone in engines, the fuel is designated by the term B100.

The term "gasoline of $E_x$ type for spark ignition engines" means a gasoline fuel which contains x % (v/v) of oxygen-based compounds, generally ethanol, bioethanol and/or tert-butyl ethyl ether (TBEE).

The sulfur content of the liquid fuel is preferably less than or equal to 5000 ppm, preferably less than or equal to 500 ppm and more preferentially less than or equal to 50 ppm, or even less than 10 ppm and advantageously sulfur-free.

The block copolymer described above is used as detergent additive in the liquid fuel in a content advantageously of at least 10 ppm, preferably at least 50 ppm, more preferentially in a content from 10 to 5000 ppm, even more preferentially from to 1000 ppm.

According to a particular embodiment, the use of a block copolymer as described previously in the liquid fuel makes it possible to maintain the cleanliness of at least one of the internal parts of the internal combustion engine and/or to clean at least one of the internal parts of the internal combustion engine.

The use of the block copolymer in the liquid fuel makes it possible in particular to limit or prevent the formation of deposits in at least one of the internal parts of said engine ("keep-clean" effect) and/or to reduce the existing deposits in at least one of the internal parts of said engine ("clean-up" effect).

Thus, the use of the copolymer in the liquid fuel makes it possible, when compared with liquid fuel that is not specially supplemented with additive, to limit or prevent the formation of deposits in at least one of the internal parts of said engine or to reduce the existing deposits in at least one of the internal parts of said engine.

Advantageously, the use of the copolymer in the liquid fuel makes it possible to observe both effects simultaneously, limitation (or prevention) and reduction of deposits ("keep-clean" and "clean-up" effects).

The deposits are distinguished as a function of the type of internal combustion engine and of the location of the deposits in the internal parts of said engine.

According to a particular embodiment, the internal combustion engine is a spark ignition engine, preferably with direct injection (DISI: direct-injection spark ignition engine). The deposits targeted are located in at least one of the internal parts of said spark ignition engine. The internal part of the spark ignition engine kept clean and/or cleaned up is advantageously chosen from the engine intake system, in particular the intake valves (IVD: intake valve deposit), the combustion chamber (CCD: combustion chamber deposit, or TCD: total chamber deposit) and the fuel injection system, in particular the injectors of an indirect injection system (PFI: port fuel injector) or the injectors of a direct injection system (DISI).

According to another particular embodiment, the internal combustion engine is a diesel engine, preferably a direct-injection diesel engine, in particular a diesel engine with a common-rail injection system (CRDI: common-rail direct injection). The deposits targeted are located in at least one of the internal parts of said diesel engine.

Advantageously, the deposits targeted are located in the injection system of the diesel engine, preferably located on an external part of an injector of said injection system, for example the fuel spray tip and/or on an internal part of an injector of said injection system (IDID: internal diesel injector deposits), for example on the surface of an injector needle.

The deposits may be constituted of coking-related deposits and/or deposits of soap and/or lacquering type.

The block copolymer as described previously may advantageously be used in the liquid fuel to reduce and/or prevent power loss due to the formation of deposits in the internal parts of a direct-injection diesel engine, said power loss being determined according to the standardized engine test method CEC F-98-08.

The block copolymer as described previously may advantageously be used in the liquid fuel to reduce and/or prevent restriction of the fuel flow emitted by the injector of a direct-injection diesel engine during its functioning, said flow restriction being determined according to the standardized engine test method CEC F-23-1-01.

Advantageously, the use of the copolymer as described above makes it possible, when compared with liquid fuel that is not specially supplemented, to limit or prevent the formation of deposits on at least one type of deposit described previously and/or to reduce the existing deposits on at least one type of deposit described previously.

According to a particular embodiment, the use of the block copolymer described above also makes it possible to reduce the fuel consumption of an internal combustion engine.

According to another particular embodiment, the use of the block copolymer described above also makes it possible to reduce the pollutant emissions, in particular the particle emissions of an internal combustion engine.

Advantageously, the use of the block copolymer makes it possible to reduce both the fuel consumption and the pollutant emissions.

The block copolymer described above may be used alone, in the form of a mixture of at least two of said block copolymers or in the form of a concentrate.

The block copolymer may be added to the liquid fuel in a refinery and/or may be incorporated downstream of the refinery and/or optionally as a mixture with other additives in the form of an additive concentrate, also known by the common name "additive package".

The block copolymer described above is used as a mixture with an organic liquid in the form of a concentrate.

According to a particular embodiment, a fuel concentrate comprises one or more copolymers as described above, as a mixture with an organic liquid.

The organic liquid is inert with respect to the block copolymer described above and miscible in the liquid fuel described previously. The term "miscible" describes the fact that the block copolymer and the organic liquid form a solution or a dispersion so as to facilitate the mixing of the block copolymer in the liquid fuels according to the standard fuel supplementation processes.

The organic liquid is advantageously chosen from aromatic hydrocarbon-based solvents such as the solvent sold under the name Solvesso, alcohols, ethers and other oxygen-based compounds and paraffinic solvents such as hexane, pentane or isoparaffins, alone or as a mixture.

The concentrate may advantageously comprise from 5% to 99% by mass, preferably from 10% to 80% and more preferentially from 25% to 70% of copolymer as described previously.

The concentrate may typically comprise from 1% to 95% by mass, preferably from 10% to 70% and more preferentially from 25% to 60% of organic liquid, the remainder corresponding to the copolymer, it being understood that the concentrate may comprise one or more block copolymers as described above.

In general, the solubility of the block copolymer in the organic liquids and the liquid fuels described previously will depend especially on the weight-average and number-average molar masses $M_w$ and $M_n$, respectively, of the copolymer. The average molar masses $M_w$ and $M_n$ of the block copolymer will be chosen so that the copolymer is soluble in the liquid fuel and/or the organic liquid of the concentrate for which it is intended.

The average molar masses $M_w$ and $M_n$ of the block copolymer may also have an influence on the efficiency of this copolymer as a detergent additive. The average molar masses $M_w$ and $M_n$ will thus be chosen so as to optimize the effect of the block copolymer, especially the detergency effect (engine cleanliness) in the liquid fuels described above.

According to a particular embodiment, the copolymer advantageously has a weight-average molar mass (Mw) ranging from 500 to 30 000 g·mol$^{-1}$, preferably from 1000 to 10 000 g·mol$^{-1}$, more preferentially less than or equal to 4000 g·mol$^{-1}$, and/or a number-average molar mass (Mn) ranging from 500 to 15 000 g·mol$^{-1}$, preferably from 1000 to 10 000 g·mol$^{-1}$, more preferentially from 3000 to 8000 g·mol$^{-1}$, even more preferentially from 3000 to 7000 g·mol$^{-1}$ and in particular from 4000 to 5000 g·mol$^{-1}$. According to one variant, the number-average molar mass (Mn) is less than or equal to 4000 g·mol$^{-1}$. The number-average and weight-average molar masses are measured by size exclusion chromatography (SEC). The operating conditions of SEC, especially the choice of the solvent, will be chosen as a function of the chemical functions present in the block copolymer.

According to a particular embodiment, the block copolymer is used in the form of an additive concentrate in combination with at least one other fuel additive for an internal combustion engine other than the block copolymer described previously.

The additive concentrate may typically comprise one or more other additives chosen from detergent additives other than the block copolymer described above, for example from anticorrosion agents, dispersants, de-emulsifiers, antifoams, biocides, reodorants, procetane additives, friction modifiers, lubricant additives or oiliness additives, combustion promoters (catalytic combustion and soot promoters), agents for improving the cloud point, the flow point or the FLT (filterability limit temperature), anti-sedimentation agents, anti-wear agents and conductivity modifiers.

Among these additives, mention may be made in particular of:

a) procetane additives, especially (but not limitingly) chosen from alkyl nitrates, preferably 2-ethylhexyl nitrate, aryl peroxides, preferably benzyl peroxide, and alkyl peroxides, preferably tert-butyl peroxide;

b) antifoam additives, especially (but not limitingly) chosen from polysiloxanes, oxyalkylated polysiloxanes and fatty acid amides derived from plant or animal oils. Examples of such additives are given in EP861882, EP663000 and EP736590;

c) cold flow improvers (CFI) chosen from copolymers of ethylene and of an unsaturated ester, such as ethylene/vinyl acetate (EVA), ethylene/vinyl propionate (EVP), ethylene/vinyl ethanoate (EVE), ethylene/methyl methacrylate (EMMA) and ethylene/alkyl fumarate copolymers described, for example, in U.S. Pat. Nos. 3,048,479, 3,627,838, 3,790,359, 3,961,961 and EP261957;

d) lubricant additives or anti-wear agents, especially (but not limitingly) chosen from the group constituted by fatty acids and ester or amide derivatives thereof, especially glyceryl monooleate, and monocyclic and polycyclic carboxylic acid derivatives; Examples of such additives are given in the following documents: EP680506, EP860494, WO98/04656, EP915944, FR2772783, FR2772784;

e) cloud point additives, especially (but not limitingly) chosen from the group constituted by long-chain olefin/(meth)acrylic ester/maleimide terpolymers, and fumaric/maleic acid ester polymers. Examples of such additives are given in FR2528051, FR2528051, FR2528423, EP112195, EP172758, EP271385 and EP291367;

f) detergent additives, especially (but not limitingly) chosen from the group constituted by succinimides, polyetheramines and quaternary ammonium salts; for example those described in U.S. Pat. No. 4,171,959 and WO2006135881;

g) cold workability polyfunctional additives chosen from the group constituted by polymers based on olefin and alkenyl nitrate as described in EP573490.

These other additives are generally added in an amount ranging from 100 to 1000 ppm (each).

The mole ratio and/or mass ratio between monomer $m_b$ and monomer $m_a$ and/or between block A and B in the block copolymer described above will be chosen so that the block copolymer is soluble in the fuel and/or the organic liquid of the concentrate for which it is intended. Similarly, this ratio may be optimized as a function of the fuel and/or of the organic liquid so as to obtain the best effect on the engine cleanliness.

Optimizing the mole ratio and/or mass ratio may be performed via routine tests accessible to those skilled in the art.

The mole ratio between monomer $m_b$ and monomer $m_a$ or between blocks A and B in the block copolymer described above advantageously ranges from 1:10 to 10:1, preferably from 1:2 to 2:1 and more preferentially from 1:0.5 to 0.5:2.

According to a particular embodiment, a fuel composition is prepared according to any known process by supplementing the liquid fuel described previously with at least one block copolymer as described above.

According to a particular embodiment, a fuel composition comprising:
(1) a fuel as described above, and
(2) one or more block copolymers as described previously.

The fuel (1) is chosen in particular from hydrocarbon-based fuels and fuels that are not essentially hydrocarbon-based described previously, alone or as a mixture.

The combustion of this fuel composition comprising such a copolymer in an internal combustion engine produces an effect on the cleanliness of the engine when compared with the liquid fuel not specially supplemented and makes it possible in particular to prevent or reduce the fouling of the internal parts of said engine. The effect on the cleanliness of the engine is as described previously in the context of using the block copolymer.

According to a particular embodiment, combustion of the fuel composition comprising such a block copolymer in an internal combustion engine also makes it possible to reduce the fuel consumption and/or the pollutant emissions.

The block copolymer is preferably incorporated in small amount into the liquid fuel described previously, the amount of block copolymer being sufficient to produce a detergent effect as described above and thus to improve the engine cleanliness.

The fuel composition advantageously comprises at least 5 ppm, preferably from 10 to 5000 ppm, more preferentially from 20 to 2000 ppm and in particular from 50 to 500 ppm of block copolymer(s) (2).

Besides the block copolymer described above, the fuel composition may also comprise one or more other additives different than the block copolymer according to the invention, chosen from the other known detergent additives, for example from anticorrosion agents, dispersants, de-emulsifiers, antifoams, biocides, reodorants, procetane additives, friction modifiers, lubricant additives or oiliness additives, combustion promoters (catalytic combustion and soot promoters), agents for improving the cloud point, the flow point or the FLT, anti-sedimentation agents, anti-wear agents and/or conductivity modifiers.

The various additives of the block copolymer according to the invention are, for example, the fuel additives listed above.

According to a particular embodiment, a process for maintaining the cleanliness (keep-clean) and/or for cleaning (clean-up) at least one of the internal parts of an internal combustion engine comprises the preparation of a fuel composition by supplementation of a fuel with one or more block copolymers as described above and combustion of said fuel composition in the internal combustion engine.

According to a particular embodiment, the internal combustion engine is a spark ignition engine, preferably with direct injection (DISI).

The internal part of the spark ignition engine that is kept clean and/or cleaned is preferably chosen from the engine intake system, in particular the intake valves (IVD), the combustion chamber (CCD or TCD) and the fuel injection system, in particular the injectors of an indirect injection system (PFI) or the injectors of a direct injection system (DISI).

According to another particular embodiment, the internal combustion engine is a diesel engine, preferably a direct-injection diesel engine, in particular a diesel engine with a common-rail injection system (CRDI).

The internal part of the diesel engine that is kept clean (keep-clean) and/or cleaned (clean-up) is preferably the injection system of the diesel engine, preferably an external part of an injector of said injection system, for example the fuel spray tip and/or one of the internal parts of an injector of said injection system, for example the surface of an injector needle.

The process for maintaining the cleanliness (keep-clean) and/or for cleaning (clean-up) comprises the successive steps of:

a) determination of the most suitable supplementation for the fuel, said supplementation corresponding to the selection of the block copolymer(s) described above to be incorporated in combination, optionally, with other fuel additives as described previously and the determination of the degree of treatment necessary to achieve a given specification relative to the detergency of the fuel composition.

b) incorporation into the fuel of the selected block copolymer(s) in the amount determined in step a) and, optionally, of the other fuel additives.

The block copolymer(s) may be incorporated into the fuel, alone or as a mixture, successively or simultaneously.

Alternatively, the block copolymer(s) may be used in the form of a concentrate or of an additive concentrate as described above.

Step a) is performed according to any known process and falls within the common practice in the field of fuel supplementation. This step involves defining at least one representative characteristic of the detergency properties of the fuel composition.

The representative characteristic of the detergency properties of the fuel will depend on the type of internal combustion engine, for example a diesel or spark ignition engine, the direct or indirect injection system and the location in the engine of the deposits targeted for cleaning and/or maintaining the cleanliness.

For direct-injection diesel engines, the representative characteristic of the detergency properties of the fuel may correspond, for example, to the power loss due to the formation of deposits in the injectors or restriction of the fuel flow emitted by the injector during the functioning of said engine.

The representative characteristic of the detergency properties may also correspond to the appearance of lacquering-type deposits on the injector needle (IDID).

Methods for evaluating the detergency properties of fuels have been widely described in the literature and fall within the general knowledge of a person skilled in the art. Non-limiting examples that will be mentioned include the tests standardized or acknowledged by the profession or the following methods described in the literature:

For Direct-Injection Diesel Engines:
  the method DW10, standardized engine test method CEC F-98-08, for measuring the power loss of direct-injection diesel engines
  the method XUD9, standardized engine test method CEC F-23-1-01 Issue 5 for measuring the restriction of fuel flow emitted by the injector
  the method described by the Applicant in patent application WO 2014/029770, pages 17 to 20, for the evaluation of lacquering deposits (IDID), this method being cited by way of example and/or incorporated by reference into the present patent application.

For Indirect-Injection Spark Ignition Engines:
  the Mercedes Benz M102E method, standardized test method CEC F-05-A-93, and
  the Mercedes Benz M111 method, standardized test method CEC F-20-A-98.

These methods make it possible to measure the intake valve deposits (IVD), the tests generally being performed on a Eurosuper gasoline corresponding to standard EN228.

For Direct-Injection Spark Ignition Engines:
  the method described by the Applicant in the article "Evaluating Injector Fouling in Direct Injection Spark Ignition Engines", Mathieu Arondel, Philippe China, Julien Gueit; Conventional and future energy for automobiles; 10th international colloquium; Jan. 20-22, 2015, pages 375-386 (Technische Akademie Esslingen par Techn. Akad. Esslingen, Ostfildern), for the evaluation of the coking deposits on the injector, this method being cited by way of example and/or incorporated by reference into the present patent application.
  the method described in US20130104826 for the evaluation of the coking deposits on the injector, this method being cited by way of example and/or incorporated by reference into the present patent application.

The determination of the amount of block copolymer to be added to the fuel composition to achieve the specification will typically be performed by comparison with the fuel composition not containing the block copolymer according to the invention.

The determination of the amount of copolymer to be added to the fuel composition to achieve the specification (step a) described previously) will typically be performed by comparison with the fuel composition not containing the copolymer according to the invention, the specification given relative to the detergency possibly being, for example, a target power loss value according to the method DW10 or a flow restriction value according to the method XUD9 mentioned above.

The amount of block copolymer may also vary as a function of the nature and origin of the fuel, in particular as a function of the content of compounds bearing n-alkyl, isoalkyl or n-alkenyl substituents. Thus, the nature and origin of the fuel may also be a factor to be taken into consideration for step a).

The process for maintaining the cleanliness (keep-clean) and/or for cleaning (clean-up) may also comprise an additional step after step b) of checking the target reached and/or of adjusting the amount of supplementation with the copolymer(s) as detergent additive.

The block copolymers according to the invention have noteworthy properties as detergent additive in a liquid fuel, in particular in a gas oil or gasoline fuel.

Example: Synthesis of Block Copolymers by Reversible Addition-Fragmentation Chain-Transfer (RAFT) Radical Polymerization Reaction Products:
  Polymerization initiator: α,α'-azoisobutyronitrile, AIBN, (CAS 78-67-1)
  RAFT transfer agent:
    2-Cyano-2-propyl benzodithioate >97%, CPD (CAS 201611-85-0)
    S,S₀-dibenzyl trithiocarbonate 98%, DBTTC (CAS 26504-29-0).
  Cleaving agent:
    99% hexylamine (CAS 11-26-2)
  To obtain block B—monomers $m_b$:
    98% 2-dimethylaminoethyl methacrylate, DMAEMA (CAS 2867-47-2),
    98% 2-dimethylaminoethyl acrylate, DMAEA (CAS 2439-35-2)

99% N-[3-(dimethylamino)propyl]methacrylamide, DMAPMA (CAS 5205-93-6)

To obtain block A:
98% 2-ethylhexyl acrylate, EHA (CAS 103-11-7
98% 2-ethylhexyl methacrylate, EHMA (CAS 688-84-6, Quaternizing agent
98% bromoethane (CAS 74-96-4)
98% 1,2-epoxybutane (CAS 106-88-7)

For the copolymer nomenclature, the following will be used:
For the intermediate copolymer, the letter $C^x$ with, in subscript, the abbreviations of the starting monomers used.
For the final copolymer, the abbreviations of the starting monomers used, separated by a "/".
the letter b- before each name to indicate the fact that the copolymer is a block copolymer
the letter s- before each name to indicate the fact that the copolymer is a statistical copolymer.

The superscripts "Br" or "Epo" are associated with the letters b- or s- when bromoethane or 1,2-epoxybutane is used, respectively, for the quaternization.
the letter q- before each name indicates the fact that the amine is quaternized.

Example 1—Synthesis of a Block Copolymer Using EHMA and DMAEMA and Quaternization with Bromoethane Copolymerization—Production of a block copolymer $b\text{-}C^1_{EHMA/DMAEMA}$ 1.1 g (7 mmol) of DMAEMA and 338 mg (1.53 mmol) of CPD are dissolved in 0.7 mL of toluene and the solution is then sparged with nitrogen for 30 minutes. 25 mg of AIBN (0.15 mmol) are dissolved in 1 mL of toluene and the solution is then sparged with nitrogen for 30 minutes. The reaction medium is heated to 80° C. and the AIBN solution is then added under nitrogen. The reaction medium is stirred under nitrogen for 6 hours at 80° C.

5 mL of EHMA (22.69 mmol) are dissolved in 3.11 mL of toluene and the solution is then sparged with nitrogen for 30 minutes. 25 mg of AIBN (0.15 mmol) are dissolved in 2 mL of toluene and the solution is then sparged with nitrogen for 30 minutes. The EHMA solution and then the AIBN solution are successively introduced into the reaction medium under nitrogen. The medium is stirred under nitrogen for about 16 hours at 80° C. After returning to room temperature and an air atmosphere, the solvent is evaporated to dryness.

The contents of residual EHMA and DMAEMA monomers and the relative composition of the copolymer (EHMA/DMAEMA mole ratio) are determined by $^1$H NMR spectroscopy and the number of EHMA and DMAEMA units are determined by $^{13}$C NMR.

For the determination of the contents of residual monomers, two series of ethylenic signals are used (AMX3 systems): a first at 5.99 ppm and 5.43 ppm (DMAEMA), and a second at 5.97 ppm and 5.41 ppm (EHMA). By using the integral of the singlet associated with 1,2,4,5-tetrachloro-3-nitrobenzene (TCNB) (7.7 ppm) as unit reference, and taking into account the molar masses of the compounds involved (198, 157 and 261 g·mol−1 for EHMA, DMAEMA and TCNB, respectively), the content of residual EHMA is 1.8% by mass and the content of residual DMAEMA is 0.2% by mass.

For the determination of the relative composition (EHMA/DMAEMA mole ratio), the multiplet at about 0.8 ppm associated with the two CH3 groups (6H) of the EHMA units of the copolymer and a multiplet at 2.3-2.6 ppm associated with the NCH2 (2H) of the DMAEMA units are used. The integrals of these signals are directly linked to the relative number of EHMA and DMAEMA units such that: nDMAEMA/nEHMA=3×(/2.3-2.6 ppm/0.8 ppm)=0.32, i.e. an EHMA/DMAEMA mole ratio of 76/24.

For the calculation of the number of units, by setting the integral of the signal at 132.3 ppm (associated with 1 aromatic CH group of the benzodithioate) at 1, an integral for the multiplet for the OCH2 groups (1C) of the EHMA units (67.8-66.5 ppm) and an integral for the multiplet for the NCH2 groups (1C) of the DMAEMA units (57.4-56.8 ppm) of 20 and 6, respectively, are obtained. Thus, if it is assumed that all the polymer chains comprise the benzodithioate group as end group, then the copolymer comprises 20 EHMA units and 6 DMAEMA units.

The number-average molecular mass (Mn), the weight-average molecular mass (Mw) and the polydispersity index (Ip) of the copolymer $b\text{-}C^1_{EHMA/DMAEMA}$ are measured by SEC with a differential refractometer (RI: refractive index) detector and with polymethyl methacrylate (PMMA) as standard.

Molecular mass: Mn=4900 g/mol; Mw=5290 g/mol; Ip=1.08.

Quaternization—Production of a block copolymer $b^{Br}\text{-}EHMA_{20}/q\text{-}DMAEMA_6$.

5.9 g of copolymer $b\text{-}C^1_{EHMA/DMAEMA}$ obtained previously are dissolved in 20 mL of dichloromethane. 2.3 mL (30.82 mmol) of bromoethane are added to the reaction medium. The solution is stirred for 6 hours at reflux and overnight at room temperature. The solvent is evaporated to dryness. The quaternized copolymer is dissolved in toluene. The organic phase is washed three times with aqueous sodium acetate solution (2M). The organic phase is then washed once with water and then once with saturated NaCl solution. After drying over MgSO4, the organic phase is evaporated to dryness. 5.89 g of copolymer $b^{Br}\text{-}EHMA_{20}/q\text{-}DMAEMA_6$ are obtained.

Example 2—Synthesis of a Block Copolymer Using EHMA and DMAEMA and Quaternization with 1,2-Epoxybutane Copolymerization—Production of a Block Copolymer $b\text{-}C^2_{HMA/DMAEMA}$ 1.1 g (7 mmol) of DMAEMA and 642 mg (1.45 mmol) of CPD are dissolved in 1.8 mL of toluene and the solution is then sparged with nitrogen for 30 minutes. 47 mg (0.29 mmol) of AIBN are dissolved in 1 mL of toluene and the solution is then sparged with nitrogen for 30 minutes. The reaction medium is heated to 80° C. and the AIBN solution is then added under nitrogen. The reaction medium is stirred under nitrogen for 6 hours at 80° C. Half of the medium is taken for analysis, under nitrogen. 5 mL (22.69 mmol) of EHMA are dissolved in 3.13 mL of toluene and the solution is then sparged with nitrogen for 30 minutes. 24 mg (0.15 mmol) of AIBN are dissolved in 2 mL of toluene and the solution is then sparged with nitrogen for 30 minutes. The EHMA solution and then the AIBN solution are successively introduced into the reaction medium under nitrogen. The medium is stirred under nitrogen for about 16 hours at 80° C. After returning to room temperature and an air atmosphere, the solvent is evaporated to dryness.

The contents of residual EHMA and DMAEMA monomers and the relative composition of the copolymer (EHMA/DMAEMA mole ratio) are determined by $^1$H NMR spectroscopy and the number of EHMA and DMAEMA units are determined by $^{13}$C NMR.

For the determination of the contents of residual monomers, two series of ethylenic signals are used (AMX3 systems): a first at 5.99 ppm and 5.43 ppm (DMAEMA), and a second at 5.97 ppm and 5.41 ppm (EHMA). By using the integral of the singlet associated with TCNB (7.7 ppm) as unit reference, and taking into account the molar masses of the compounds involved (198, 157 and 261 g·mol−1 for EHMA, DMAEMA and TCNB), the content of residual EHMA is 0.5% by mass and the content of residual DMAEMA is less than 0.1% by mass.

For the determination of the relative composition (EHMA/DMAEMA mole ratio), the multiplet at about 0.8 ppm associated with the two CH3 groups (6H) of the EHMA units of the copolymer and a multiplet at 2.3-2.6 ppm associated with the NCH2 (2H) of the DMAEMA units are used. The integrals of these signals are directly linked to the relative number of EHMA and DMAEMA units such that: $n_{DMAEMA}/n_{EHMA}=3\times(/2.3-2.6 \text{ ppm}/0.8 \text{ ppm})=0.22$, i.e. an EHMA/DMAEMA mole ratio of 82/18.

For the calculation of the number of units, by setting the integral of the signal at 132.3 ppm (associated with 1 aromatic CH group of the benzodithioate) at 1, an integral for the multiplet for the OCH2 groups (1C) of the EHMA units (67.8-66.5 ppm) and an integral for the multiplet for the NCH2 groups (1C) of the DMAEMA units (57.4-56.8 ppm) of 20 and 6, respectively, are obtained. Thus, if it is assumed that all the polymer chains comprise the benzodithioate group as end group, then the copolymer comprises 23 EHMA units and 5 DMAEMA units.

Molecular mass: Mn=4300 g/mol; Mw=4900 g/mol; Ip=1.14.

Quaternization—Production of a Block Copolymer $b^{Epo}$-EHMA$_{23}$/q-DMAEMA$_5$.

3.056 g of copolymer b-C$^2_{EHMA/DMAEMA}$ are dissolved in 20 mL of n-butanol and 10 mL of toluene. 2.8 mL (32.19 mmol) of epoxide and 1.8 mL (32.47 mmol) of acetic acid are introduced into the medium. The reaction medium is stirred for 16 hours at 60° C. After returning to room temperature, the solvent is evaporated to dryness. The copolymer $b^{Epo}$-EHMA$_{23}$/q-DMAEMA$_5$ is obtained.

Example 3—Synthesis of a Block Copolymer Using EHA and DMAPMA and Quaternization with 1,2-Epoxybutane Copolymerization—Production of a block copolymer b-C$^3_{EHA/DMAPMA}$ 25 mg (0.15 mmol) of AIBN and 3 mL of toluene are placed in a 10 mL round-bottomed flask and degassed under a stream of nitrogen for 30 minutes. 10.8 mL (51.87 mmol) of EHA, 1.003 g (3.45 mmol) of DBTTC and 6.5 mL of toluene are placed in a 50 mL round-bottomed flask with stirring and under a stream of nitrogen for 30 minutes also.

Once the heating mantle has reached the required 80° C., the AIBN solution is injected into the 50 mL round-bottomed flask. The reaction medium is left for 7 hours at 80° C. 26 mg (0.16 mmol) of AIBN and 3 mL of toluene are placed in a 10 mL round-bottomed flask and degassed under a stream of nitrogen for 30 minutes. 1.556 g (9.14 mmol) of DMAPMA and 1.5 mL of toluene are placed in a 10 mL round-bottomed flask with stirring and under a stream of nitrogen for 30 minutes also. Following sparging, the solutions present in the two 10 mL round-bottomed flasks are mixed and the reaction medium is left for 7 hours at 80° C. After drying on a rotary evaporator, the copolymer before cleavage is obtained.

The contents of residual EHA and DMAPMA monomers and the relative composition of the copolymer (EHA/DMAPMA mole ratio) are determined by $^1$H NMR spectroscopy and the number of EHA and DMAPMA units are determined by $^{13}$C NMR.

For the contents of residual monomers, three signals are detected at 6.34, 6.08 and 5.76 ppm (AMX system), which are attributed to the three ethylenic protons of the residual EHA monomer. Signals at 5.69 ppm and 5.24 ppm associated with the DMAPMA (AMX3 system) are also detected. By normalizing the integral of the singlet associated with TCNB to 1, the contents of residual EHA and DMAPMA are obtained. Content of residual EHA monomers=0.1% by mass; content of residual DMAPMA monomers=1.1% by mass.

For the relative composition, the multiplet at about 3.4-3.0 ppm associated with the N(H)CH2 of the DMAPMA units (2H) of the copolymer and a multiplet at about 0.85 ppm associated with the two CH3 of the EHA units (6H) are used. The integrals of these signals are directly linked to the relative number of DMAPMA and EHA units via:

nDMAPMA/nEHA=3×(13.4-3.0 ppm/10.85 ppm)=3×(0.74/12.5)=0.18, i.e. an EHA/DMAPMA mole ratio=85/15.

For the calculation of the number of units, the signals at 141.5 ppm (1C) and at 126.0 ppm (CH) for the benzyl group are detected on the spectrum obtained by $^{13}$C NMR. By calibrating the integral for the multiplet at about 126 ppm to 2.00, an integral of 1.93 is obtained for the signal at 141.5 ppm. The mean integral of the signals associated with the EHA units of the copolymer is 46. The number of EHA units is thus 46. By using the EHA/DMAPMA mole ratio determined previously, it is deduced that the number of DMAPMA units is 6.

3.49 g of the copolymer are dissolved in 349 mL of THF with stirring and under a stream of nitrogen, for 30 minutes. 316 mg (3.12 mmol) of hexylamine are dissolved in THF under a stream of nitrogen for 30 minutes and the hexylamine solution is then injected into the reaction medium. The reaction medium is stirred for 24 hours under a stream of nitrogen. After drying on a rotary evaporator, the copolymer b-C$^3_{EHA/DMAPMA}$ is obtained in an EHA/DMAPMA mole ratio of 85/15 which comprises 23 EHA units and 3 DMAPMA units (it is considered that the cleavage does not change the molar composition). Molar mass: Mn=3300 g/mol; Mw=4851 g/mol; Ip=1.47.

Quaternization—Production of a Block Copolymer $b^{Epo}$-EHA$_{23}$/q-DMAPMAPMA$_3$.

2.881 g of polymer are dissolved in 40 mL of n-butanol at 50° C. After dissolution of the polymer, 1 mL (17.49 mmol) of acetic acid and then 1.5 mL (17.24 mmol) of 1,2-epoxybutane are introduced into the medium. The reaction medium is stirred for 24 hours at 50° C. After returning to room temperature, the solvent is evaporated to dryness. The copolymer $b^{Epo}$-EHA$_{23}$/q-DMAPMA$_3$ is obtained.

Example 4—Synthesis of a Statistical Copolymer Using EHA and DMAEMA and Quaternization with Bromoethane Copolymerization—Production of a Statistical Copolymer s-C$^4_{EHA/DMAEMA}$ 257 mg (1.57 mmol) of AIBN and 5 mL of toluene are placed in a 10 mL round-bottomed flask and degassed under a stream of nitrogen for 30 minutes. 22.62 mL (108.63 mmol) of EHA, 6.1 mL (36.20 mmol) of DMAEMA, 365 mg (4 mmol) of 1-butanethiol and 43 mL of toluene are placed in a 250 mL round-bottomed flask with stirring and under a stream of nitrogen for 30 minutes. Once the heating mantle has reached a temperature of 70° C., the AIBN solution is injected into the reaction medium. The mixture is left for 6 hours at 70° C.

The contents of residual EHA and DMAEMA monomers and the relative composition of the copolymer (EHA/DMAEMA mole ratio) are determined by $^1$H NMR spectroscopy For the determination of the contents of residual monomers, two series of ethylenic signals are used (AMX3 systems): a first at 5.99 ppm and 5.43 ppm (DMAEMA), and a second at 6.36, 6.10 and 5.78 ppm (EHA). By using the integral of the singlet associated with TCNB (7.7 ppm) as unit reference, and taking into account the molar masses of the compounds involved (184, 157 and 261 g·mol−1 for EHA, DMAEMA and TCNB), the content of residual EHA is 4.8% by mass and the content of residual DMAEMA is less than 0.1% by mass.

For the relative composition (EHA/DMAEMA mole ratio), a multiplet at 2.3-2.6 ppm associated with the NCH2 (2H) of the DMAEMA units and a multiplet at about 0.85 ppm associated with the two CH3 of the EHA units (6H) are used. The integrals of these signals are directly linked to the relative number of EHA and DMAEMA units. An EHA/DMAEMA mole ratio of 75/25 is obtained.

After drying on a rotary evaporator, the statistical copolymer s-C$^5_{EHA/DMAEMA}$ is obtained in an EHA/DMAEMA mole ratio of 75/25. As for example 1, the contents of residual EHMA and DMAEMA monomers are calculated by $^1$H NMR spectroscopy. Content of residual EHA monomers=4.8% by mass; content of residual DMAEMA monomers <0.1% by mass. Molar mass: Mn=5900 g/mol; Mw=10 800 g/mol; Ip=1.83. The numbers of EHA and DMAEMA units are deduced from the molar mass Mn and from the EHA/DMAEMA ratio determined by NMR. 24 EHA units and 9 DMAEMA units are found.

Quaternization—Production of a Statistical Copolymer s$^{Br}$-EHA$_{24}$/q-DMAEMA$_9$.

6.312 g of the statistical copolymer s-C$^4_{EHA/DMAEMA}$ are dissolved in 63 mL of dichloromethane at room temperature. After dissolving the polymer, 3.03 g (28.05 mmol) of bromoethane are added to the reaction medium. The reaction medium is stirred for 6 hours at 50° C. and then at room temperature overnight. After drying on a rotary evaporator, the statistical copolymer s$^{Br}$-EHA$_{24}$/q-DMAEMA$_9$ is obtained in an EHA/q-DMAEMA mole ratio of 75/25.

Comparative Example 5—Synthesis of a Statistical Copolymer Using EHA and DMAEMA and Quaternization with 1,2-Epoxybutane Copolymerization—Production of a Statistical Copolymer s-C$^5_{EHA/DMAEMA}$ 112 mg (0.68 mmol) of AIBN and 3 mL of toluene are placed in a 10 mL round-bottomed flask and degassed under a stream of nitrogen for 30 minutes. 11.33 mL (54.42 mmol) of EHA, 1.507 g (9.59 mmol) of DMAEMA, 157 mg (1.74 mmol) of 1-butanethiol and 18 mL of toluene are placed in a 50 mL round-bottomed flask with stirring and under a stream of nitrogen for 30 minutes. Once the heating mantle has reached a temperature of 70° C., the AIBN solution is injected into the reaction medium. The mixture is left for 6 hours at 70° C. After drying on a rotary evaporator, the statistical copolymer s-C$^6_{EHA/DMAEMA}$ is obtained.

The contents of residual EHA and DMAEMA monomers and the relative composition of the copolymer (EHA/DMAEMA mole ratio) are determined by $^1$H NMR spectroscopy.

For the determination of the contents of residual monomers, two series of ethylenic signals are used (AMX3 systems): a first at 5.99 ppm and 5.43 ppm (DMAEMA), and a second at 6.36, 6.10 and 5.78 ppm (EHA). By using the integral of the singlet associated with TCNB (7.7 ppm) as unit reference, and taking into account the molar masses of the compounds involved (184, 157 and 261 g·mol−1 for EHA, DMAEMA and TCNB), the content of residual EHA is 4.7% by mass and the content of residual DMAEMA is less than 0.1% by mass.

For the relative composition (EHA/DMAEMA mole ratio), a multiplet at 2.3-2.6 ppm associated with the NCH2 (2H) of the DMAEMA units and a multiplet at about 0.85 ppm associated with the two CH3 of the EHA units (6H) are used. The integrals of these signals are directly linked to the relative number of EHA and DMAEMA units. An EHA/DMAEMA mole ratio of 84/16 is obtained.

Content of residual EHA monomers=4.7% by mass; content of residual DMAEMA monomers <0.1% by mass. Molar mass: Mn=6700 g/mol; Mw=14 070 g/mol; Ip=2.10. The numbers of EHA and DMAEMA units are deduced from the molar mass Mn and from the EHA/DMAEMA ratio determined by NMR. 31 EHA units and 7 DMAEMA units are found.

Quaternization—Production of a Statistical Copolymer s$^{Epo}$-EHA$_{31}$/q-DMAEMA$_7$.

6.592 g of the statistical copolymer s-C$^5_{EHA/DMAEMA}$ are dissolved in 66 mL of butanol at 50° C. After dissolution of the polymer, 3.4 mL (59.45 mmol) of acetic acid and 5.2 mL (59.78 mmol) of 1,2-epoxybutane are added to the reaction medium. The reaction medium is stirred for 24 hours at 50° C. After drying on a rotary evaporator, the statistical copolymer s$^{Epo}$-EHA$_{31}$/q-DMAEMA$_7$ is obtained.

Other copolymers were synthesized according to the same protocols as examples 1 to 5 described above, but by varying the parameters, especially the starting monomers. The operating conditions and the characteristics of the copolymers obtained are collated in table 2 below:

with clean injectors, the flow rate of which was determined beforehand. The engine follows a determined test cycle for 10 hours and 3 minutes (repetition of the same cycle 134 times). At the end of the test, the flow rate of the injectors is again evaluated. The amount of fuel required for the test

TABLE 2

| | Starting monomers | % of residual monomers[1] | Quaternizing agent | Mole ratio[2] | $M_n^{(3)}$ | $Ip^{(3)}$ | Stat[7]/ block | Number of units[4] | |
|---|---|---|---|---|---|---|---|---|---|
| | | | | | | | | A[5] | B[6] |
| $b^{Epo}$-EHMA$_{24}$/q-DMAEMA$_3$ | EHMA DMAEMA | 0.8 <0.1 | 1,2-epoxybutane | 88/12 | 3000 | 1.52 | block | 24 | 3 |
| $b^{Epo}$-EHMA$_{23}$/q-DMAEMA$_5$ | EHMA DMAEMA | 0.5 <0.1 | 1,2-epoxybutane | 82/18 | 4300 | 1.14 | block | 23 | 5 |
| $b^{Epo}$-EHMA$_{30}$/q-DMAEMA$_8$ | EHMA DMAEMA | 1.4 1.4 | 1,2-epoxybutane | 79/21 | 5000 | 1.1 | block | 30 | 8 |
| $b^{Epo}$-EHMA$_{39}$/q-DMAEMA$_{17}$ | EHMA DMAEMA | 0.4 2.2 | 1,2-epoxybutane | 70/30 | 6300 | 1.17 | block | 39 | 17 |
| $b^{Br}$-EHMA$_{20}$/q-DMAEMA$_6$ | EHMA DMAEMA | 0.8 <0.1 | Bromoethane | 76/24 | 4900 | 1.08 | block | 20 | 6 |
| $b^{Epo}$-EHA$_{26}$/q-DMAEMA$_8$ | EHA DMAEMA | 0.5 <0.1 | 1,2-epoxybutane | 76/24 | 5300 | 1.49 | block | 26 | 8 |
| $b^{Epo}$-EHA$_{23}$/q-DMAPMA$_3$ | EHA DMAPMA | 0.1 1.1 | 1,2-epoxybutane | 92/8 | 3300 | 1.47 | block | 23 | 3 |
| $s^{Br}$-EHA$_{24}$/q-DMAEMA$_9$ | EHA DMAEMA | 4.8 <0.1 | Bromoethane | 75/25 | 5900 | 1.83 | Stat | 24 | 9 |
| $s^{Epo}$-EHA$_{31}$/q-DMAEMA$_7$ | EHA DMAEMA | 4.7 <0.1 | 1,2-epoxybutane | 84/16 | 6700 | 2.1 | Stat | 31 | 7 |

[1]Content of residual monomers calculated from the analysis of 1H NMR measurements taken with a Bruker 600 MHz spectrometer (1H Larmor frequency) operating under TopSpin 2.1. The measuring probe used is an X{1H}{19F} BBFO double-resonance probe with z pulsed magnetic field gradient and 2H lock (probe specifications: 13C signal-to-noise (S/N) ratio: ASTM = 312:1; 10% EB = 278:1). The analysis is performed at 300 K, the polymer concentrations are variable in 0.6 mL of CDCl3, in the presence of a known mass of 1,2,4,5-tetrachloro-3-nitrobenzene* (TCNB) used as internal standard for the absolute quantification of the residual monomer species. The 1H and 13C chemical shifts were calibrated with the 1H and 13C signals of CDCl3: $\delta_{1H}$ 7.26 ppm and $\delta_{13C}$ 77.16 ppm
[2]Mole ratio calculated after quaternization
[3]Mn, Mw and the polydispersity index (Ip) determined by SEC, with a Waters Styragel machine operating at 40° C. and 645 psi with a flow rate of THF of 1 ml/minute, equipped with an RI detector. The solvent used is THF stabilized with BHT (1 g/l) and the flow rate is set at 1 mL · min$^{-1}$. The number-average molar masses ($M_n$) were determined by RI (refractive index) detection from the calibration curves constructed for PMMA standards.
[4]The values of n and p are determined from the mole ratio, from the Mn and from the mass of the monomers. It is considered that the quaternization has little influence on the Mn of the final copolymer, with negligible Mn variation. The values of n and p are rounded up to whole numbers.
[5]Number of units represents the value of p for block A according to formula (I) or the number of units of apolar monomers in the statistical copolymer under consideration.
[6]Number of units represents the value of n for block B according to formula (I) or the number of units of polar monomers in the statistical copolymer under consideration.

XUD9 Engine Test—Determination of the Loss of Flow Rate

The XUD9 test makes it possible to determine the restriction of the flow of a gas oil emitted by the injector of a prechamber diesel engine during its functioning, according to the standardized engine test method CEC F-23-1-01.

The object of this XUD9 test is to evaluate the ability of the gas oil and/or of the additive and/or of the additive composition tested to maintain the cleanliness, "keep-clean" effect, of the injectors of a four-cylinder Peugeot XUD9 A/L injection and prechamber diesel engine, in particular to evaluate its ability to limit the formation of deposits on the injectors.

The tests were performed on a virgin gas oil (GOM B7) corresponding to standard EN590 containing 7% (vol/vol) or (v/v) of fatty acid methyl ester (FAME) and said supplemented gas oil GOM B7, abbreviated as GOMx with a content of additive treatment of 50 ppm by mass of active material.

The test is started with a four-cylinder Peugeot XUD9 A/L injection and prechamber diesel engine engine equipped is 60 liters. The loss of flow rate is measured on the four injectors. The results are expressed as a percentage loss of flow rate for various needle lifts. Usually, the fouling values are compared at a needle lift of 0.1 mm since they are more discriminating and more precise and repeatable (repeatability <5%). The change in loss of flow rate before/after test makes it possible to deduce the percentage loss of flow rate. Taking into account the repeatability of the test, a significant detergent effect can be asserted for a reduction in the loss of flow rate, i.e. a gain in flow rate of greater than 10 points (>10%) relative to a virgin fuel.

The results are collated in table 3 below:

TABLE 5

| Ref. | Detergency additive | $M_n^{(3)}$ | Statistical/ block | Loss of flow rate* (%) | Gain in flow rate* (%) |
|---|---|---|---|---|---|
| GOM B7 | — | — | — | 70.4 | 0 |
| GOM1 | $b^{Epo}$-EHMA$_{24}$/q-DMAEMA$_3$ | 3000 | block | 21.8 | 48.6 |

TABLE 5-continued

| Ref. | Detergency additive | $M_n^{(3)}$ | Statistical/ block | Loss of flow rate* (%) | Gain in flow rate* (%) |
|---|---|---|---|---|---|
| GOM2 | $b^{Epo}$-EHMA$_{23}$/q-DMAEMA$_5$ | 4300 | block | 6.4 | 64 |
| GOM3 | $b^{Epo}$-EHMA$_{30}$/q-DMAEMA$_8$ | 5000 | block | 3.0 | 67.4 |
| GOM4 | $b^{Epo}$-EHMA$_{39}$/q-DMAEMA$_{17}$ | 6300 | block | 12.3 | 58.1 |
| GOM5 | $b^{Br}$-EHMA$_{20}$/q-DMAEMA$_6$ | 4900 | block | 30.6 | 39.8 |
| GOM6 | $b^{Epo}$-EHA$_{26}$/q-DMAEMA$_8$ | 5300 | block | 32.1 | 38.3 |
| GOM7 | $b^{Epo}$-EHA$_{23}$/q-DMAPMA$_3$ | 3300 | block | 48.5 | 21.9 |
| GOM8 | $s^{Br}$-EHA$_{24}$/q-DMAEMA$_9$ | 5900 | Statistical | 85.8 | −15.4 |
| GOM9 | $s^{Epo}$-EHA$_{31}$/q-DMAEMA$_7$ | 6700 | Statistical | 84.9 | −14.5 |

*mean for the four injectors

It is observed that the fuels GOM1 to GOM7 have a noteworthy effect on limiting the fouling of XUD9 injectors when compared with the non-supplemented fuel GOM B7. GOM8 and GOM9 foul the XUD9 injectors significantly, when compared with the non-supplemented fuel GOM B7.

The gas oil compositions GOM1 to GOM B7 supplemented with the copolymer according to the present invention show a loss of flow rate less than that of the tested reference GOM B7. Supplementation of GOM7 with the copolymer according to the invention makes it possible to obtain a mean loss of flow rate of less than 50% and a mean gain in flow rate of greater than 20%, even with a very low degree of supplementation of 50 ppm m/m.

The block copolymers according to the invention have noteworthy properties as detergent additive in a liquid fuel, in particular in a gas oil or gasoline fuel.

The block copolymers according to the invention are particularly noteworthy especially since they are efficient as detergent additive for a wide range of liquid fuels and/or for one or more types of engine specification and/or against one or more types of deposit which become formed in the internal parts of internal combustion engines.

The invention claimed is:

1. A fuel composition comprising:
(1) a liquid fuel derived from one or more sources chosen from the group consisting of mineral, animal, plant and synthetic sources, and
(2) from 5 to 5000 ppm of one or more block copolymers comprising:
at least one block A of formula (I) below, which consists of a chain of structural units derived from an alkyl (meth)acrylate monomer ($m_a$):

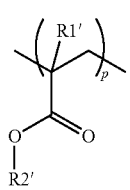

(I)

in which
p is an integer ranging from 2 to 100,
$R_1'$ is chosen from hydrogen and a methyl group,
$R_2'$ is chosen from $C_1$ to $C_{34}$ hydrocarbon-based chains, at least one block B of formula (II) below, which consists of a chain of structural units derived from an alkyl (meth)acrylate or alkyl(meth)acrylamide monomer ($m_b$):

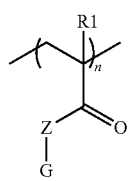

(II)

in which
n is an integer ranging from 2 to 40,
$R_1$ is chosen from hydrogen and a methyl group,
Z is chosen from an oxygen atom and a group —NR'— with R' being chosen from a hydrogen atom and $C_1$ to $C_{12}$ hydrocarbon-based chains,
G is a $C_i$ to $C_{34}$ hydrocarbon-based chain substituted with at least one quaternary ammonium group and optionally one or more hydroxyl groups.

2. The fuel composition as claimed in claim 1, comprising at least 10 ppm of block copolymer(s) (2).

3. The fuel composition as claimed in claim 1, in which the fuel (1) is chosen from hydrocarbon-based fuels, fuels that are not essentially hydrocarbon-based, and mixtures thereof.

4. The fuel composition as claimed in claim 1, in which the monomer ($m_a$) is chosen from $C_4$ to $C_{30}$ alkyl acrylates and $C_4$ to $C_{30}$ alkyl methacrylates.

5. The fuel composition as claimed in claim 1, in which the quaternary ammonium group is chosen from pyrrolinium, pyridinium, imidazolium, triazolium, triazinium, oxazolium and isoxazolium quaternary salts.

6. The fuel composition as claimed in claim 1, in which the quaternary ammonium group is chosen from trialkylammonium, guanidinium and iminium quaternary salts.

7. The fuel composition as claimed in claim 1, in which block B is represented by one of the formulae (III) and (IV) below:

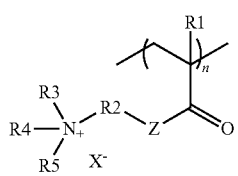

(III)

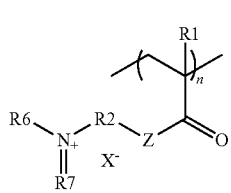

(IV)

in which

X⁻ is chosen from hydroxide and halide ions and organic anions, $R_2$ is chosen from $C_1$ to $C_{34}$ hydrocarbon-based chains, substituted with at least one hydroxyl group, $R_3$, $R_4$ and $R_5$ are identical or different and chosen independently from $C_1$ to $C_{18}$ hydrocarbon-based chains, it being understood that the alkyl groups $R_3$, $R_4$ and $R_5$ may contain one or more groups chosen from: a nitrogen atom, an oxygen atom and a carbonyl group and that the groups $R_3$, $R_4$ and $R_5$ may be connected together in pairs to form one or more rings, $R_6$ and $R_7$ are identical or different and chosen independently from $C_i$ to $C_{18}$ hydrocarbon-based chains, it being understood that the groups $R_6$ and $R_7$ may contain one or more groups chosen from: a nitrogen atom, an oxygen atom and a carbonyl group and that the groups $R_6$ and $R_7$ may be connected together to form a ring.

8. The fuel composition as claimed in claim 1, in which the block copolymer is obtained by sequenced polymerization, optionally followed by one or more post-functionalizations.

9. The fuel composition as claimed in claim 1, in which the copolymer is a copolymer comprising at least one sequence of blocks AB, ABA or BAB in which said blocks A and B form a sequence without the presence of an intermediate block of different chemical nature.

10. The fuel composition as claimed in claim 1, in which p is an integer ranging from 2 to 40.

11. The fuel composition as claimed in claim 1, in which p is an integer greater than 40 and less than or equal to 100.

12. The fuel composition as claimed in claim 7, in which the group $R_2$ is represented by one of the formulae (V) and (VI) below:

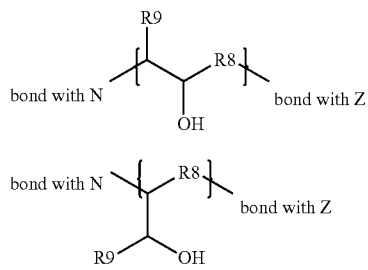

in which $R_8$ is chosen from $C_1$ to $C_{32}$ hydrocarbon-based chains, $R_9$ is chosen from hydrogen and $C_1$ to $C_6$ alkyl groups.

13. The fuel composition as claimed in claim 12, in which block B of formula (III), (IV), (V) or (VI) is derived from a monomer ($m_b$) obtained by the reaction:

of a tertiary amine of formula $NR_3R_4R_5$ or $R_6N{=}R_7$, and of a (meth)acrylate or (meth)acrylamide intermediate monomer ($m_i$) of formula (VII) below:

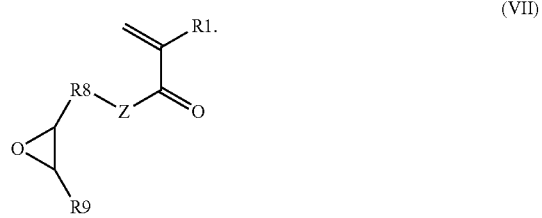

14. The fuel composition as claimed in claim 12, in which block B is obtained by post-functionalization of an intermediate polymer Pi comprising at least one block P of formula (VIII) below:

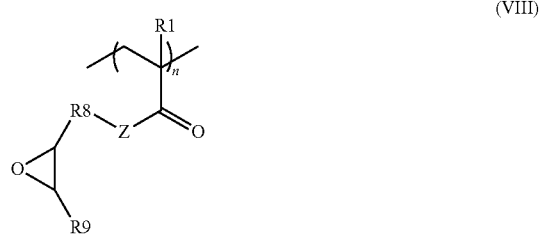

in which said post-functionalization corresponds to the reaction of said intermediate polymer Pi with a tertiary amine $NR_3R_4R_5$ or $R_6N{=}R_7$.

15. The fuel composition as claimed in claim 14, in which the intermediate polymer Pi also comprises at least one block A of formula (I).

\* \* \* \* \*